Patented Feb. 25, 1947

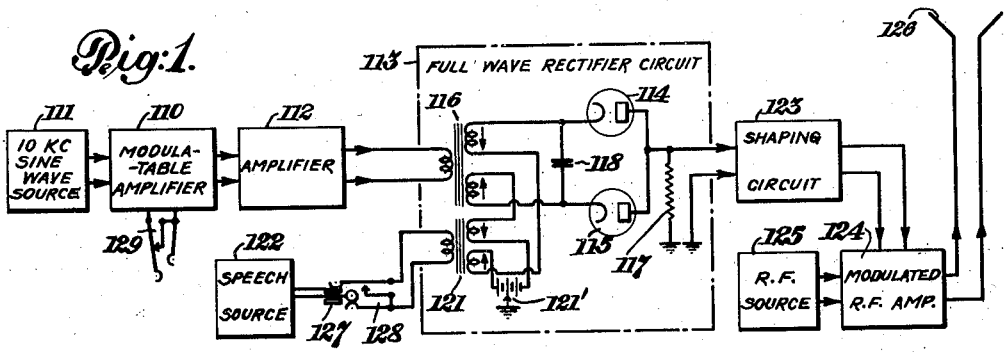

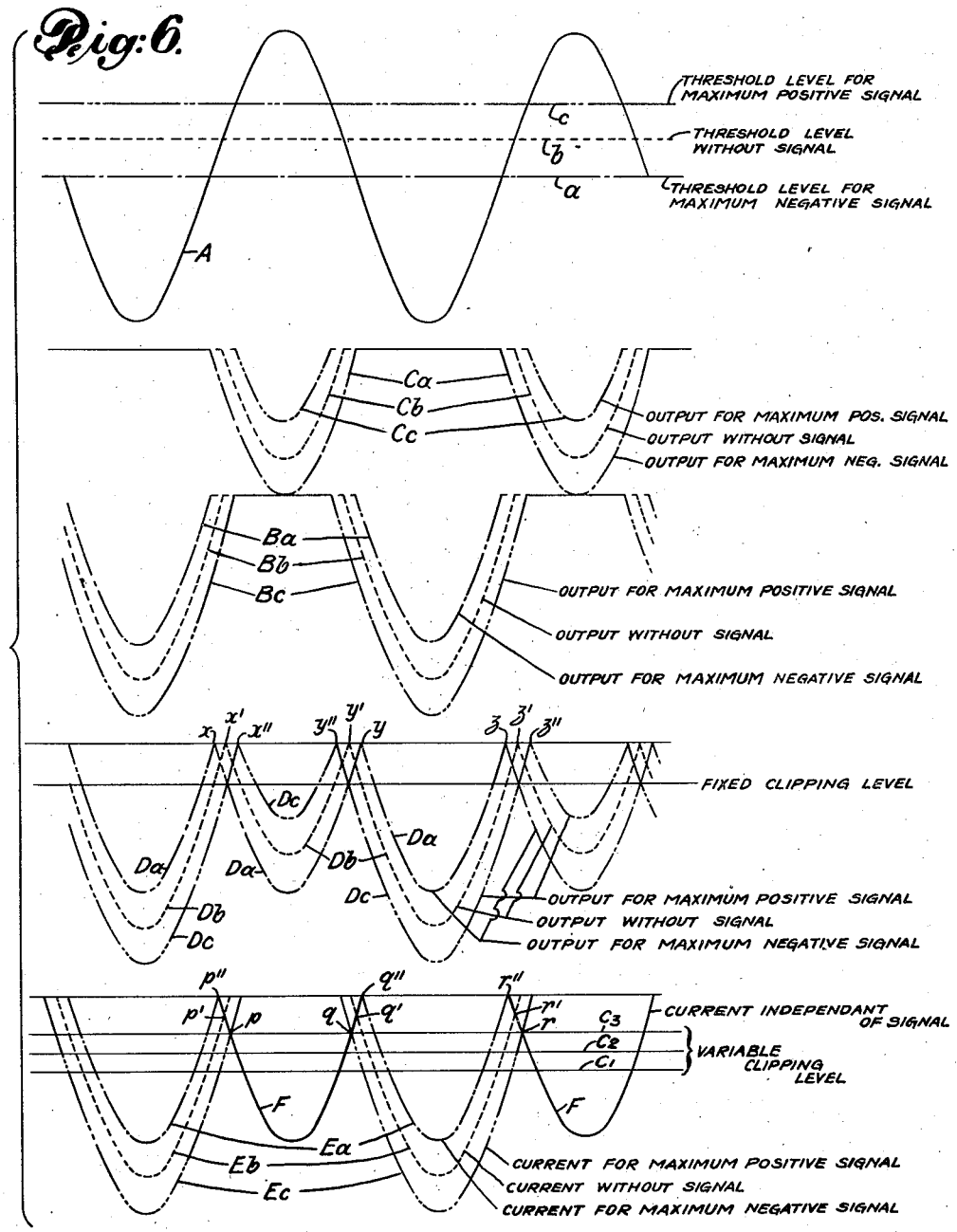

2,416,329

UNITED STATES PATENT OFFICE 2,416,329

PUSH-PULL MODULATION SYSTEM

Emile Labin, New York, and Donald D. Grieg, Forest Hills, N. Y., assignors to Federal Telephone and Radio Corporation, a corporation of Delaware Application August 24, 1942, Serial No. 455,897

26 Claims. (Cl. 179—171.5)

The present invention relates to pulse generation and more particularly to systems for generating time modulated pulses for use in communication systems and for other uses.

Several types of systems have been proposed for effecting communication by transmitting a number of pulses of current, the exact times of transmission of such pulses being controlled in accordance with the speech or other intelligence to be transmitted. In some cases the pulses of current are themselves transmitted to a distance over wires, but in other cases they are used to modulate carriers so as to produce brief wave trains generally referred to as carrier pulses. Such systems of communication have been described in U. S. Patents 2,266,401, 2,256,336, 2,265,337, 2,262,838, and in copending U. S. applications 386,282 and 425,108, respectively, filed on April 1, 1941, by E. Labin, and on December 31, 1941, by E. M. Deloraine and E. Labin, as well as in a large number of other foreign patents and applications. In accordance with the systems heretofore proposed, the generation of time modulated pulses was effected either by means of special vacuum tubes having cam-like target or masking means cut to a predetermined shape, or by providing multivibrator arrangements controlled by resistance/condenser time constants and capable of being influenced by the modulating signals so as to vary the vibrator rate.

It is an object of the present invention to provide a simpler, more reliable, and more economical method of generating time modulated pulses.

More particularly, it is an object to provide a system for generating time modulated pulses by the use of ordinary types of circuit components without requiring specially designed tubes.

It is a further object to provide such a system for generating time modulated pulses which shall be capable of being stabilized by a master source of fixed waves, such as a sine wave oscillator or a stable unmodulated relaxation oscillator.

More particularly, it is an object to provide such a system wherein the time of the generated pulses is controlled by a fixed unmodulated wave.

Other objects of the invention will readily appear to those skilled in the art from the following detailed description of the invention, taken together with the annexed drawings, in which:

Fig. 1 is a schematic diagram of a time modulation transmitter embodying one form of our invention, and making use of electronic diode rectifiers for performing a full wave rectifying function.

Fig. 2 represents a modified form of rectifying circuit which may be substituted for the rectifying circuit of Fig. 1 and which effects modulation in a simpler but less symmetric fashion and employs dry rectifiers in place of electronic diodes for performing the full wave rectification.

Fig. 3 represents a further form of rectifying circuit similar to that of Fig. 1 making use of triodes in place of diodes for performing the full wave rectifier action.

Fig. 4 represents a circuit arrangement which may be substituted for the sine wave source shown in Fig. 1 and which is adapted to deliver triangular waves instead of sine waves.

Fig. 5a represents a shaping circuit arrangement which is used with the several circuits of Figures 1, 2, 3, 4.

Fig. 5b represents an alternative type of shaping circuit utilizing double differentiation which may be substituted for that of Fig. 5a.

Fig. 6 is a set of curves useful in describing the operation of the invention.

Referring more particularly to Fig. 1, 111 is a sine wave source of good frequency stability having a frequency of the order of several kilocycles. For speech of the usual quality this would be of the order of 10 kc. The sine wave output from this source is delivered through an amplifier 110 and, if desired, through another amplifier 112 (which may be more or less limiting action for a purpose later to be described) to the full wave rectifying circuit 113. This circuit as shown essentially comprises two wave transmission means such as diodes Nos. 114 and 115 of the ordinary hot cathode electronic type, an input transformer 116 and an output resistor 117. In many cases it is desirable to provide a condenser 118 across the secondary of the transformer 116 to tune this approximately to the 10 kc. sine wave input thus increasing the amplitude of the signal and allowing a low impedance path for the modulating signal through transformer 116.

It will be noted that the transformer 116 instead of merely having a center tapped secondary has a split secondary with the modulating transformer 121 being inserted between the two windings. The modulating transformer 121 has also a split secondary in order to allow the insertion of battery 121', which serves to bias the diodes 114 and 115 in opposite sense so as to unbalance the rectifier. The modulating signal applied to this transformer 121 may be speech from a source 122. The symmetrical disposition of transformers 116 and 121 allows the effects of the D. C. currents in these transformers to be canceled out. The output of circuit 113 is applied to a limiter and shaping amplifier which delivers time modulated pulses of the type described in copending U. S. application 386,282. The output from the shaping circuit 123 is then applied to modulate an R.-F. amplifier 124 which is excited from a suitable R.-F. source 125 and whose output is radiated over an antenna 126.

The operation of the system of Fig. 1 can best be understood from the following detailed explanation taken in conjunction with the curves of Fig. 6 and the diagram of Fig. 1. The sine waves applied between the plates of diodes 114 and 115 are represented by curve A of Fig. 6 in relation to the various thresholds of rectification which may exist for different values of the speech input signal potential. Assuming, first, for simplicity that the speech source is delivering its maximum negative potential via transformer 121 and assuming that such potential is just equal and opposite to the potential of battery 121' so that the resultant potential difference across each half of the secondary of transformer 121 with respect to ground is zero, it will then be clear that the plates of the diodes 114 and 115 will swing symmetrically above and below ground potential.

Since the resistor 117 is returned to ground, and since the diode currents in this resistance cancel out, ground potential is the threshold level above which each of the rectifiers begin to pass current and therefore the threshold $a$ represented by a dot dash line in Fig. 6 is shown as symmetrically disposed with respect to the input sine wave A. Under such conditions the output from rectifier 114 will have the form shown in curve $Ba$ and the output from rectifier 115 will have the exactly similar form shown in curve $Ca$. The combined output current flowing through resistor 117 will have the form shown in curve $Da$ being thus a simple half wave rectifying sine wave having a number of sharp cusps $x$, $y$, $z$ equally spaced in time.

If we consider conditions at an opposite extreme of the speech voltage when the potential delivered through transformer 121 is again equal to the potential of battery 121' but is in the same sense so as to aid the battery potential, it will then be clear that under such conditions the plate of diode 114 will be several volts positive with respect to ground while that of diode 115 will be a corresponding number of volts negative with respect to ground. Under such conditions current will tend to flow through diode 114 except through the most negative portions of the sine wave input and therefore the current output from this diode will be of the form shown in curve $Bc$. Conversely, the diode 115 will by its negative bias be prevented from carrying current except during the brief intervals when the lower end of transformer 116 is strongly positive and thus the output current from this diode will have the form shown in curve $Cc$ in Fig. 6. Thus the combined output from both diodes flowing through receiver 117 will have the form shown in curve $Dc$ consisting of alternately large and small peaks with the cusps $x''$, $y''$, $z''$ unequally spaced.

Because of the symmetrical manner of applying the biasing potentials in circuit 113 it will be noticed that as one rectifier passes more than half a cycle the other passes correspondingly less than half a cycle of the input wave and therefore one may consider that the effect of the modulation is to shift the rectification threshold which in the absence of bias would be as shown at $a$ with respect to the sine wave A, to the asymmetric position shown in $c$. If curve A be taken as representing the wave applied to the primary of transformer 116, then the region above any given threshold represents the portion of the cycle which is passed by the upper rectifier 114 while the region below a threshold represents that portion of the cycle passed by rectifier 115. During the time when the speech signal has its maximum negative value (so that the total bias due to transformer battery 121' is zero) the effective threshold will be threshold $a$. During the opposite extreme as explained, the threshold $c$ will be effective.

For zero values of the input speech signal the bias of the full wave rectifier will have an intermediate value and the threshold $b$ will be effective. Under such zero signal conditions the output from rectifier 114 will correspond to those portions of curve A above the threshold $b$, being thus of the form shown in curve $Bb$ while output from rectifier 115 will correspond to those portions of curve A below this threshold $b$, being thus of the form shown in curve $Cb$. The combined output during zero signal intervals will be of the form shown in curve $Db$ consisting of a number of peaks (or troughs) whose amplitudes differ and whose cusps $x'$, $y'$, $z'$ are correspondingly unequally spaced in time.

The various cusps $x$, $y$, $z$ or $x'$, $y'$, $z'$ or $x''$, $y''$, $z''$ are thus "time modulated" i. e. the time intervals $xy$ and $yz$ are respectively reduced to $x''y''$ and increased to $y''z''$ or vice versa, corresponding to the amplitude of the modulating signal applied through the transformer 121.

Fig. 2 represents another simpler form of full wave rectifying circuit which may be substituted for circuit 113 of Fig. 1. This arrangement is essentially similar to circuit 113 except that the audio-input transformer 221 does not require a split-secondary winding and the battery 221' need not be center tapped. The two rectifiers 214 and 215 are represented as dry rectifiers in the circuit of Fig. 2 rather than being electronic diodes as in circuit 113. It will be understood, however, that diodes can be used in the circuit of Fig. 2 or dry rectifiers can be used in the circuit of Fig. 1, as may be desired.

The simplification of the circuit of Fig. 2 is effected by arranging the modulating and biasing potentials from transformer 221 and battery 221 in asymmetric fashion so that only the upper rectifier 214 receives the biasing and modulating potentials, while the other rectifier 215 is returned directly to ground. The operation of the circuit of Fig. 2 is correspondingly slightly different, as illustrated in curves $Ea$, $Eb$, $Ec$ and $F$ of Fig. 6. The output from rectifier 215 is unaltered by the modulation and always has the form of part of the curve F consisting of a series of semi sine waves spaced one cycle apart. But the current flow in diode 215 is stopped at the various instants $p$, $q$, $r$ or $p'$, $q'$, $r'$ or $p''$, $q''$, $r''$ depending upon the value of additional bias on rectifier 215 due to the drop in resistance 217 produced by the variable current flowing through the rectifier 214 plus the modulating bias. This variable current depends upon the modulation as shown of curves $Ea$, $Eb$, $Ec$. During the moment when the modulating signal has its maximum negative value we may assume that this signal just cancels the biasing voltage of battery 221 so that the net bias of rectifier 214 is zero. Under such conditions the output from this rectifier 214 will consist of a series of half sine waves as shown in curve $Ea$. During the opposite polarity of the speech signal, when this signal has its maximum positive value, rectifier 214 will have a bias equal to the sum of the speech signal and the battery bias plus the drop in resistance 217, and thus will transmit more than half cycle of the input wave A, so as to yield an output such as shown in curve $Ec$ which starts at the instants $p$, $q$, $r$. During intermediate conditions when the speech signal has zero value the positive bias on rectifier 114' will be just equal to the voltage of battery 121' and the corresponding output will be only slightly greater than a half sine wave having the form of curve Eb of Fig. 6 starting at the instants $p'$, $q'$, $r'$. The combined output from the two rectifiers will, during intervals of maximum negative signal, consist of a combination of curves Ea and F, being thus a simple full wave rectified sine wave with equally spaced cusps at times $p''$, $q''$, $r''$. During the intervals of maximum positive speech signal, on the other hand, the combined output in resistor 117 of Fig. 2 will be a combination of the curves Ec and F, the cusps taking place at the instants $p'$, $q'$, $r'$.

It will be noted that simultaneously with the displacement of the cusps a corresponding variation in amplitude takes place, as shown by the subsequent positions $p$, $p'$, $p''$. In order to obtain identical pulses modulated in time only, it is necessary to provide a variable clipping level in the subsequent shaping stage, in the opposite sense to the amplitude variations. It is one of the purposes of the shaping circuits of Figs. 5a and 5b described in the following to provide this compensating bias.

Fig. 3 illustrates still another form of circuit, making use of triodes in place of diodes for effecting the full wave rectifying action. The input transformer 316 serves in this circuit not only for applying the 10 kc. foundation wave to the "rectifying" elements 314 and 315 but also for applying the modulating bias thereto. For this purpose the transformer has in addition to its main primary winding 341 an auxiliary split primary consisting of windings 342 and 343. The main primary winding 341 receives the 10 kc. input while the auxiliary primary 342—343 receives the speech modulating signal. Both primaries are symmetrically coupled to the split-secondary so as to deliver both the foundation wave and the modulating signal in push-pull fashion to the triodes 314 and 315. It will be understood that these triodes do not actually act as true rectifiers in the sense of a non-linear impedance for conducting current asymmetrically; rather they act as amplifiers to produce in the output a curve which is more or less proportional to the input over a certain range of input voltages and which is substantially unresponsive to variations in input below such predetermined input voltage. The threshold at which such tubes become unresponsive to variations in input signal is the so-called "cutoff" point ordinarily corresponding to a few volts negative potential on the control grid.

The two biasing batteries 321' and 321'' have preferably such values that tube 315 is about as far below cutoff as tube 314 is above its cutoff point. The difference between these two batteries, moreover, is preferably such that when the audio modulating signal has its maximum negative value (thus rendering the grid of tube 314 more negative and that of 315 more positive) the grids will be at the same potential and will both be just at the cutoff point. Under such conditions the outputs from the tubes 314 and 315, respectively, will correspond to curves Ba and Ca of Fig. 6 and the combined output thereof in resistor 317 will correspond to curve Da.

When the speech signal has its maximum positive polarity, on the other hand, the difference in potential between the grids of the tubes is accentuated and the outputs of the tubes 314 and 315 will correspond respectively to curves Bc and Cc, the combined output then corresponding to curve Dc. During intermediate conditions the intermediate curves Bb, Cb and Db will represent the outputs of tube 314, tube 315 and the combined output, respectively.

In view of the strong resemblance between the action of the triodes 314 and 315 and the corresponding action of diodes 114 and 115 it will be convenient to refer to such action generically as rectification in spite of the fact that the current in the output circuit of the triodes is theoretically a separate amplified current rather than being derived from the same energy applied to the input.

Although it is preferred to employ sine waves as the foundation waves to be full wave rectified in accordance with the present invention, it is possible to attain useful results of the invention with other wave forms. A triangular zigzag wave form is especially suitable when linear time modulation is desired over a considerable range (i. e., where it is desired that the pulses produced be displaced by a large fraction of the recurrence intervals and where it is desired that the deviation of each pulse from normal position should be directly proportional to the value of the input signal).

Fig. 4 illustrates a circuit suitable for producing such symmetrical triangular zigzag waves. As shown in Fig. 4, 401 is a square wave source which may, for example, comprise a multivibrator synchronized if desired from a sinusoidal oscillator and clipped if necessary to render its output truly square. The output from such square wave source is applied to an integrating network 402 which may be of any suitable type capable of reasonably accurately forming the integral of a waveform applied to its input circuit. The output of such integrating network 402 will be of the desired symmetric zigzag form. The circuit arrangement of Fig. 4 may be substituted for sine wave source 111 in Fig. 1 and may be used with "cusping" circuit 113 or with either of the "cusping" circuits of Fig. 2 or 3.

Fig. 5a illustrates one of the possible shaping circuit arrangements which has been designated so far by 123. This circuit follows the rectifying circuits and transforms the input waves into pulses of substantially constant amplitude and width. Basically the circuit of Fig. 5a comprises an arrangement for passing only the most positive tips of any signal applied to it. Such an arrangement for passing only the most positive peaks may comprise almost any form of detector working on the grid leak principle. In the form shown the circuit comprises a pentode 502 having its control grid fed via the RC combination of condenser 503 and grid leak 504 which determines the biasing potential on its grid. It should be noted that when the symmetrical circuit of 113 is utilized, condenser 503 and resistor 504 may be omitted and the output of circuit 113 connected directly to the grid. The output circuit of such pentode includes the load resistor 506 and the output coupling condenser 507, as well as plate and screen biasing batteries 508 and 509. Preferably the screen battery (and possibly also the plate battery) is of lower than normal potential so that the "grid base" (i. e., the voltage separation between the cutoff threshold and the grid current threshold) is only a very few volts.

The operation of the circuit of Fig. 5a when connected to the output of the cusping circuit 113 is as follows: The output of circuit 113 is in the form of a series of negative rounded peaks with sharp positive cusps therebetween. The position of such wave with respect to the zero axis will naturally aline itself to contain no D. C. component because of the presence of the coupling condenser 503 of Fig. 5.

The grid leak 504 will tend to render the control grid of tube 502 more and more negative when any substantial grid current is being drawn. Thus this grid will automatically adjust itself to the point where only the very tips of the positive cusps drive the grids sufficiently positive to draw grid current. Because of the adjustment of the tube to have a comparatively narrow grid base the result will be that only a small portion of each curve immediately adjacent the cusps will be passed by the pentode 502 since the rest of the curve will lie below the cutoff threshold. As a result the output through resistor 506 will consist of a number of narrow peaked waves corresponding to the cusps of the output wave from the circuit 113. These peaked waves may be further shaped, of course, by the inclusion of an additional clipping amplifier provided at the output of pentode 502.

When the circuit of Fig. 5a is used in conjunction with the unsymmetrical type of circuit of Fig. 2, proper adjustment of the RC combination 503, 504 permits elimination of the variations in amplitude of the cusps as described previously. This action takes place due to the compensating grid current flow. For any particular cusp amplitude a given amount of grid current will flow through the grid leak 504. For a greater or smaller cusp amplitude the amount of grid current flow will be respectively greater or smaller. The grid leak 504 in combination with the coupling condenser 503 which determines the speed and degree of compensation will thus develop a variable negative biasing potential in step with the variations in cusp amplitude. This biasing potential is applied to the grid of tube 502 providing the variable clipping level indicated on Fig. 6 by $C_1$, $C_2$, $C_3$.

Fig. 5b indicates an alternate method of shaping. The output of circuit 113 is applied through a double differentiation circuit 511 which may comprise two differentiation circuits of any known type connected in tandem with or without amplification between them. Thus two RC circuits 511 are shown in Fig. 5b followed by the amplifying pentode 512. Alternately inductance types of differentiation networks or a combination of RC and L networks may be readily substituted.

The circuits of Fig. 5a and Fig. 5b are possible forms of circuit 123 whether the circuit 113 be employed or whether the substituted circuits of Figs. 2 and 3 are used. The combination at present believed to be preferable corresponds to Fig. 1 with the modified circuits of Fig. 5a substituted therein. The other combinations, however, are equally effective.

Although it is preferred to effect the time modulation as above described by varying the relative position of the foundation wave with respect to the thresholds of discontinuity of one or both halves of the full wave rectifier, very satisfactory results can also be obtained by giving the full wave rectifying means a fixed unbalance and then amplitude modulating the foundation wave so that such fixed unbalance represents a varying percentage of the total wave amplitude of the applied foundation wave. For this purpose a jack 129 may be provided on the amplifier 110 so that plug 127 to speech source 122 may, if desired, be unplugged from clipping circuit 113 and plugged into this amplifier 110. Under such conditions the bias battery 121' of circuit 113 will maintain the diode 114 positive and the diode 115 negative by a small amount depending upon the amplitude of the waves transmitted from amplifier 110 through amplifier 112. This fixed bias will represent a greater or smaller fraction of the total sine wave amplitude and therefore the degree to which the cusps are unevenly spaced will vary with the amplitude of the sine wave from amplifier 110. Such an arrangement is ordinarily not as desirable as the previously described types of modulation wherein one of, or both, the full wave rectifier biases are altered (or where construing the action from another viewpoint the input wave is superposed upon a D. C. bias so as to shift it in position without varying with its A. C. amplitude). Very satisfactory results, however, can be obtained even when the speech source is plugged into jack 129 instead of jack 128.

Although certain embodiments of our invention have been shown and described for purposes of illustration, it will be clear that many modifications, additions and omissions may be made within the scope and spirit thereof, as defined in the appended claims.

What is claimed is:

1. A time modulation system comprising a source of fixed frequency foundation waves, full wave rectifier means connected to effectively full wave rectify said foundation waves whereby rectified waves having sharp cusps are produced, means for unbalancing said rectifier means with respect to said foundation waves by a percentage of the amplitude of said waves, a source of signal waves, means for varying said unbalance percentage under control of said signal waves whereby the spacing of said cusps is varied, and means for deriving from said rectified waves a series of pulses which correspond in time to said cusps.

2. A system according to claim 1, wherein said foundation waves are fixed in amplitude and wherein said means for varying said unbalance percentage comprises means for varying the absolute degree of unbalance.

3. A system according to claim 1, wherein said means for unbalancing said rectifier means are fixed means for producing a fixed degree of unbalance and wherein said means for varying said unbalance percentage comprise means for varying the amplitude of said foundation waves.

4. A time modulation system comprising a source of fixed frequency foundation waves, full wave rectifier means connected to effectively full wave rectify said foundation waves whereby rectified waves having sharp cusps are produced, a source of signal waves representing intelligence to be transmitted, means for unbalancing said rectifier means under control of said signal waves whereby the spacing of said cusps is varied, and means for deriving from said rectified waves a series of pulses which correspond in time to said cusps.

5. A time modulation system comprising a source of fixed frequency substantially sinusoidal foundation waves, full wave rectifier means connected to effectively full wave rectify said foundation waves whereby rectified waves having sharp cusps are produced, a source of signal waves representing speech to be transmitted, means for unbalancing said rectifier means to a variable degree under control of said signal waves whereby the spacing of said cusps is varied, and means for deriving from said rectified waves a series of narrow pulses which correspond in time to said cusps.

6. A time modulation system comprising a source of fixed frequency foundation waves, a first wave transmission means having a first discontinuity threshold and connected to transmit those portions of said foundation waves which lie on a given side of said first threshold, a second wave transmission means having a second discontinuity threshold and connected to transmit those portions of said foundation waves which lie on a given side of said second threshold, means for combining the wave portions transmitted by said first and second transmission means, whereby a combined wave having sharp cusps is produced, a source of signal waves, means for varying at least one of said discontinuity thresholds under control of said signal waves whereby the time intervals between the cusps of said combined wave are varied, and means for deriving from said combined wave a series of pulses which correspond in time to said cusps.

7. A system according to claim 6, wherein said first and second wave transmission means are rectifiers.

8. A system according to claim 6, wherein said first and second wave transmission means are electronic diode rectifiers.

9. A system according to claim 1, wherein said means for deriving a series of pulses from said rectified waves comprise means for transmitting only the tips of the cusps of said rectified waves.

10. A time modulation system comprising a source of fixed frequency foundation waves, first and second wave transmission means, each of said transmission means having a threshold clipping level for passing energy according to those portions of waves applied thereto which extend beyond the threshold level thereof, means to apply a foundation wave from said source to the first and second transmission means in push-pull relation so that said first transmission means responds to those wave portions extending beyond the threshold level thereof in one polarity direction and said second transmission means responds to those wave portions extending beyond the threshold level thereof in the opposite polarity direction, means for combining the wave portions transmitted by said first and said second transmission means whereby a combined wave having sharp cusps is produced, a source of signal energy, and means responsive to said signal energy for controlling the threshold clipping operation of the foundation wave, whereby the timing of said cusps is modulated according to said signal energy.

11. A system according to claim 10 wherein the means for controlling the threshold clipping operation includes means for varying the threshold level of one of said transmission means.

12. A system according to claim 10 wherein the means for controlling the threshold clipping operation includes means for varying simultaneously the threshold clipping levels of both said first and said second transmission means.

13. A system according to claim 10 wherein the means for controlling the threshold clipping operation includes means for maintaining fixed the threshold clipping levels of both said transmission means at levels different from the axis level of said foundation wave and means for varying the amplitude of the foundation wave according to said signal wave.

14. A system according to claim 10 in combination with means for deriving from said combined wave a series of pulses corresponding in time to said cusps.

15. A system according to claim 10 wherein said first and said second transmission means are rectifiers.

16. A system according to claim 10 wherein said first and said second transmission means are electronic diode rectifiers.

17. A system according to claim 10 wherein said first and said second wave transmission means comprise grid controlled vacuum tubes with the means for applying the foundation waves being connected in push-pull relation to the control grids thereof.

18. A system according to claim 10 wherein said first and said second wave transmission means are dry rectifiers.

19. A method of producing time modulated signals comprising producing a fixed frequency foundation wave, passing energy according to those portions of the foundation wave which extend in one polarity direction beyond a first threshold level, passing energy according to those portions of the foundation wave which extend in the opposite polarity direction beyond a second threshold level, combining the energy thus passed to produce a combined wave having sharp cusps, and controlling the relationship between said threshold levels and the amplitude of the foundation wave according to a signal wave so that the time intervals between the cusps of said combined wave vary in accordance with said signal wave.

20. A method according to claim 19 wherein the controlling operation includes varying one of the threshold levels in accordance with the signal wave.

21. A method according to claim 19 wherein said first and second clipping levels are maintained in a fixed displaced relation with respect to the axis of the foundation wave, and the controlling operation includes varying the amplitude of the foundation wave in accordance with the signal wave.

22. A method according to claim 19 wherein the controlling operation includes varying simultaneously and in opposite polarity directions the said first and said second threshold levels in accordance with the signal wave.

23. A method according to claim 19 in combination with the step of threshold clipping the cusp portions of the combined wave thereby deriving a series of narrow width pulses corresponding in time to said cusps.

24. A method according to claim 19 wherein the step of producing the foundation wave includes producing said wave in sinusoidal form.

25. A method according to claim 19 wherein the step of producing the foundation wave includes producing said wave in zig-zag form.

26. A method according to claim 19 wherein the controlling operation includes varying the threshold levels in accordance with the signal wave.

EMILE LABIN.
DONALD D. GRIEG.

REFERENCES CITED

The following references are of record in the file of this patent:

UNITED STATES PATENTS

| Number | Name | Date |
|---|---|---|
| 2,215,776 | Barnard | Sept. 24, 1940 |